(12) United States Patent
Lockie et al.

(10) Patent No.: US 7,006,794 B1
(45) Date of Patent: Feb. 28, 2006

(54) WIRELESS POINT TO MULTI-POINT COMMUNICATION APPARATUS AND METHOD

(75) Inventors: Douglas G. Lockie, Monte Sereno, CA (US); Edward A. Keible, Palo Alto, CA (US); Clifford A. Mohwinkel, San Jose, CA (US)

(73) Assignee: Endwave Corporation, Sunnyvale, CA (US)

(*) Notice: Subject to any disclaimer, the term of this patent is extended or adjusted under 35 U.S.C. 154(b) by 907 days.

(21) Appl. No.: 09/625,065

(22) Filed: Jul. 25, 2000

(51) Int. Cl.
  *H04B 15/00* (2006.01)

(52) U.S. Cl. .................. 455/62; 455/524; 455/562.1

(58) Field of Classification Search ............... 343/729, 343/757, 754, 878, 879, 725; 455/82, 132, 455/146, 147, 562, 62, 130, 68, 69, 272, 455/230, 307, 562.1, 141, 209, 32; 342/373, 342/350, 368, 372; 375/349
See application file for complete search history.

(56) References Cited

U.S. PATENT DOCUMENTS

| | | | | |
|---|---|---|---|---|
| 3,971,020 A | * | 7/1976 | Howard | 342/129 |
| 6,006,069 A | * | 12/1999 | Langston | 455/62 |
| 6,169,910 B1 | * | 1/2001 | Tamil et al. | 455/562.1 |
| 6,232,920 B1 | * | 5/2001 | Brookner et al. | 342/372 |
| 6,304,762 B1 | * | 10/2001 | Myers et al. | 455/562.1 |

* cited by examiner

*Primary Examiner*—Nay Maung
*Assistant Examiner*—Raymond Dean
(74) *Attorney, Agent, or Firm*—Steven J. Adamson

(57) ABSTRACT

A wireless communication system that provides energy efficient, high bandwidth and low cost wireless communication. In one embodiment, the communication system utilizes a fan out, pencil beam arrangement in which electromagnetic energy is transmitted from a hub to customer premises equipment (CPE) with a fan or similar antenna and from the CPEs to the hub via pencil beam antennas. The pencil beam antennas provided higher link margin. The hub may include a shared aperture antenna device for receiving pencil beam transmissions from the CPEs. A shared aperture antenna device may also be used for transmission from the hub to the CPEs.

22 Claims, 3 Drawing Sheets

WIRELESS POINT TO MULTI-POINT COMMUNICATION APPARATUS AND METHOD

FIELD OF THE INVENTION

The present invention relates to wireless communication systems and is particularly well suited to millimeter wave communication systems. More specifically, the present invention is related to providing energy efficient, low-cost point to multi-point wireless communication.

BACKGROUND OF THE INVENTION

Conventional legacy telephone networks (LTNs) use copper wire for data transfer and achieve data transfer rates of approximately 28 Kbits (KB) per second. This rate of data transfer is limited by the inherent properties of copper wire and its use throughout LTNs. Digital subscriber lines (DSLs) are available in some communities and DSL technology piggy backs on legacy copper wires and achieves data transfer rates of one or two MB.

The current push for faster phone and data lines has in part been fueled by advances in microprocessor technologies and the ability of computers to share data with one another. The development and growth of the Internet is an example of the emergence and importance of transferring data between computers or related electronic devices.

Since the inception of computer mediated data transfer, data transfer rates were limited by processor speeds and not by the mode or medium of data transfer. Efforts to improve processor speeds, however, have out paced improvements in the data transfer media. The speed of commodity microprocessors, for example, has now surpassed a gigahertz. This creates a situation where the LTN (and DSL) are far slower than processors and thus the rate limiting component of data transfer and communication.

To overcome these limitations, amongst other objectives, other data communication media have been or are being developed. These include fiber optic, microwave and millimeter wave communication media.

While fiber optic systems provide favorable data transfer rates, one disadvantage aspect is that fiber optic systems are extremely expensive to install. In urban areas, for example, the cost of burying cable is approximately one million dollars per mile.

Microwave systems (e.g., 900 MHz cellular telephone communication, etc.) provide an alternative to fiber optics that does not entail burying cable. A relative disadvantage of microwave systems, however, is that they have a significantly smaller bandwidth then millimeter wave and fiber optic systems.

Millimeter wave systems may be defined as radio systems operating between 20 and 100 GHz and hence achieve significantly higher bandwidth, though the actual data transfer rates will be less than the carrier frequency. Notwithstanding their higher bandwidth, however, millimeter wave systems are disadvantageous in that they are susceptible to rain fade and other atmospheric conditions, requiring significantly larger power transmitters to assure sufficient signal strength in foul weather.

Initial millimeter wave systems utilized pencil out, pencil back antenna arrangements to achieve point to point communication. To expand to point to multi-point communication, millimeter wave systems have been developed that are modeled on microwave point to multi-point systems. These systems utilize fan out and fan back or omni back communication antenna arrangements.

A disadvantage of fan out, fan back wireless systems, however, is that link margin is reduced by 15 to 20 dB compared to the fan out, pencil back arrangement of the present invention. To overcome link margin deficiencies, these systems utilized large and expensive power transmitters at the customer premises equipment (CPEs). Since the customer equipment is mass produced, customer equipment that is expensive and inefficient can be crippling to efforts to introduce an emerging communication technology.

Efforts to overcome link margin deficiencies also resulted in the use of higher gain, more expensive antennas at the hub.

A need thus exists for a wireless communication system and equipment therefor that has a high bandwidth and propagates data in an energy efficient and rapid manner. A need further exists for such a high bandwidth communication system that utilizes more economically priced equipment, thereby lowering barriers to entry.

SUMMARY OF THE INVENTION

Accordingly, it is an object of the present invention to provide a wireless communication system (WCS) that achieves more energy efficient point to multi-point communication.

It is another object of the present invention to provide a point to multi-point WCS with reduced-cost customer premises equipment.

It is another object of the present invention to provide a point to multi-point WCS that utilizes a fan out and pencil back antenna arrangement.

It is also an object of the present invention to provide a point to multi-point WCS that has a hub-based shared aperture receive antenna, and it is yet another object of the present invention to provide such a hub with a shared aperture transmit antenna that serves as the "fan out" antenna.

These and related objects of the present invention are achieved by use of a wireless point to multi-point communication apparatus and method as described herein.

The use of pencil beam antennas to transmit electromagnetic energy back to a hub as taught herein achieves several benefits, including but not limited to the following. Since pencil beam antennas have a higher link margin, the amount of energy needed to propagate an emission to a desired location is reduced compared to a fan or omnidirectional antenna. This results in both lower cost CPEs and reduced signal bleed into adjacent cells or sectors. Multipath interference may also be reduced.

An additional benefit of a fan out, pencil back or like arrangement is that the higher power, more expensive antenna(s) are provided at the hub. Since there is one (or few) hubs, but hundreds or thousands of CPEs, the overall cost of system implementation is reduced. Furthermore, locating the expensive equipment at the hub allows a system provider better control over the expensive equipment.

The present invention also incorporates the use of shared aperture antennas, including multi-beam and/or phased array antennas. In one embodiment, one or more shared aperture antennas are provided at a hub for receiving signals from a plurality of pencil beam CPE antennas. The shared aperture antennas may be of the reflective or refractive type. In another embodiment, one or more shared aperture antennas are also provided at that hub for transmitting signals to the plurality of pencil beam CPE antennas. Using a hub-based shared aperture device for outward signal propagation and a hub-based shared aperture device for in-bound signal reception may further reduce the power requirements of a the WCS below that of a conventional fan out arrangement.

In other embodiments, hub antennas may illuminate or receive signals from an azimuth angle of 360 degrees, and the transmit and receive antenna mechanisms may include the same antenna elements but have separate receive and transmit processing channels, etc.

The attainment of the foregoing and related advantages and features of the invention should be more readily apparent to those skilled in the art, after review of the following more detailed description of the invention taken together with the drawings.

DETAILED DESCRIPTION

Figure 1:
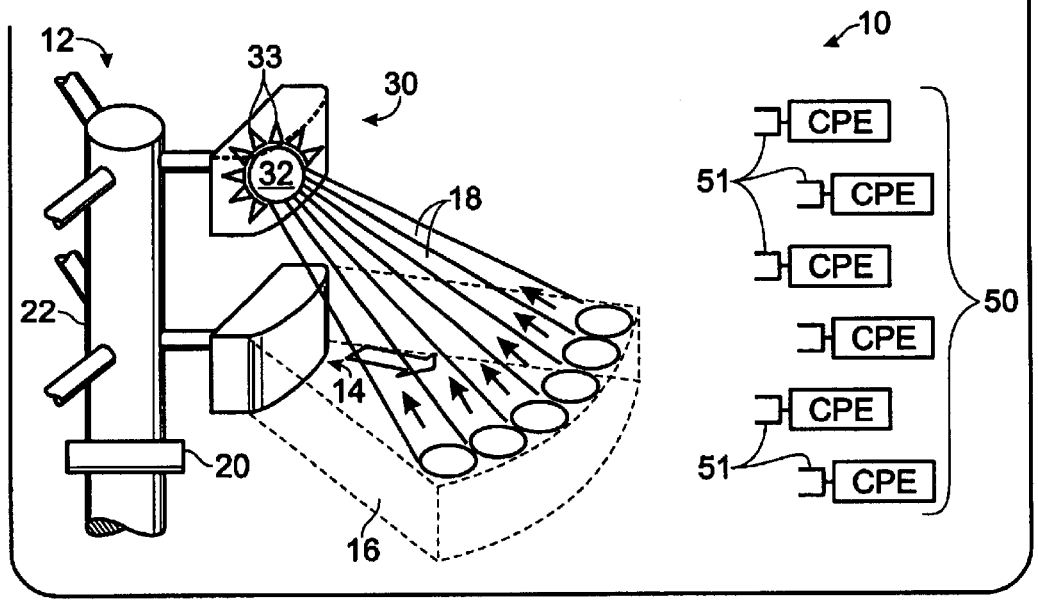
FIG. 1 is a diagram of a wireless point to multi-point communication system in accordance with the present invention.

Referring to FIG. 1, a diagram of a point to multi-point wireless communication system (WCS) 10 in accordance with the present invention is shown. System 10 preferably includes one or more hubs 12 each with a plurality of associated customer premises equipment "CPE" 50. The hub represents the point and the CPEs represent the multi-points of the point to multi-point system. While the present invention is not necessarily limited to a particular frequency range, the present invention is well suited for millimeter wave communication. Millimeter wave signals may have a frequency range of 10–100 GHz and more commonly 20–60 GHz.

Hub 12 preferably includes a fan antenna 14 and may contain many fan antennas each associated with a particular sector. The radiation pattern of antenna 14 will typically have an azimuth (or angle, α) that is greater than its elevation, though this may not be the case if very narrow sectors are defined. The azimuth to elevation ratio is preferably 2:1 or greater and more preferably 4:1 to 15:1 or greater. It should be recognized that antenna 14 may be configured to illuminate 360 degrees in azimuth. For example, an RKR (planar or cylindrical), or singular or multiple beam circular (or cylindrical) arrays, etc., may be utilized to achieve 360 degree illumination. These devices are discussed in more detail below with reference to FIGS. 8–9. Also, multiple transmit fan antenna mechanisms 14 may be utilized within a particular cell or sector if necessary to support the CPEs therein.

If sectorized cells are utilized, for example, with 3 or 4 sectors per cell, then each fan antenna 14 may cover an azimuth of 120 or 90 degrees, respectively, and have an elevation of 5–15 degrees. The antenna(s) 14 are preferably fabricated or enhanced in such a manner as to reduce sidelobes and cell to cell or sector to sector interference. The radiation "fan" or pattern of antenna 14 is denoted with reference numeral 16. Suitable fan antennas are made by EndWave Corporation of Sunnyvale, Calif.

Circuitry 20 for processing and amplifying signals for transmission is coupled to the fan antenna(s). This circuitry preferably includes a power amplifier that is suitable for transmitting millimeter wave signals over desired distances in a variety of weather conditions (transmit power is preferably boosted in response to rain, etc.). Suitable power amplifiers and weather condition detectors are available commercially.

Hub 12 also preferably includes a receive antenna mechanism 30 that receives signals from a plurality of CPE pencil beam antennas. A pencil beam 18 may be generally defined as a radiation pattern that has approximately 8 degrees or less between the half power points. Pencil beams are often circular.

In one embodiment, the receive antenna mechanism is a Luneberg lens or other shared aperture device. A Luneberg lens typically comprises a lens 32 and a plurality of feeds 33. Luneberg lens are known in the art and are an example of a refractive shared aperture device. Alternatively, any shared aperture, multi-beam or phased array receive antenna mechanism 30 may be used in place of the Luneberg lens. Shared aperture antenna devices may be refractive or reflective and examples include, but are not limited to, an ordinary plan convex, circular condensing or converging, spherical, spherical zoned bifocal, constrained or wave guide lenses or any other suitable antenna device that possess the characteristics discussed herein. For purposes of the present discussion, the term "shared aperture" antenna is generally intended to include the terms "multi-beam" antenna and "phased array" antenna. A hub-based array of pencil beam receive antennas may also be provided as the receive antenna mechanism 30.

Multiple shared aperture antennas (or pencil beam arrays) 30 may be provided at the hub (e.g., one for each corresponding sectors), though only one is shown in FIG. 1. Furthermore, multiple shared aperture antennas may be provided within a cell/sector if required to support the CPEs in that cell/sector, etc.

Circuitry 35 for processing signals received by receive antenna mechanism 30 are discussed in more detail below with reference to FIGS. 4–6.

Hub 12 may also preferably includes a support frame or tower 22 on which transmit antenna 14 and receive antenna mechanism 30 are mounted. Alternatively, the transmit and receive antennas may be mounted directly to a building or other structure or feature.

Fan antenna 14 is capable of transmitting signals to any of the plurality of CPEs 50. Each of the CPEs preferably includes a pencil beam or like antenna 51 for receiving signals from the hub and for transmitting signals back to the hub. Two separate receive and transmit antennas may be used or one antenna that diplexes between transmit and receive may be used at a CPE. Each pencil beam antenna within a cell or sector served by hub 12 is preferably directed towards the transmit (fan) and receive antenna mechanisms of hub 12. Suitable pencil beam antennas are made by EndWave Corporation of Sunnyvale, Calif. Each CPE 50 also includes circuitry for generating transmit signals and for processing signals received from the hub as discussed below.

Techniques such as code, frequency and time domain multiplexing may be utilized to simultaneously process signals from multiple CPEs.

Figure 2:
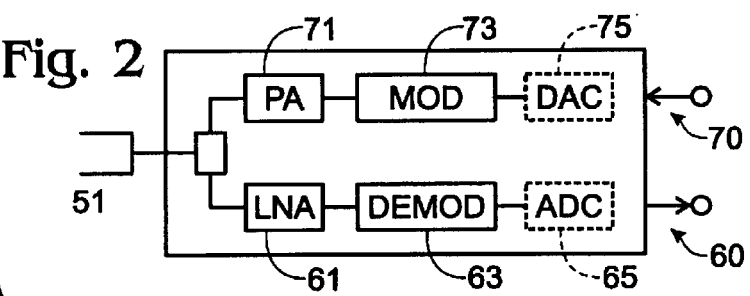
FIG. 2 is a schematic block diagram of receive and transmit circuitry within customer premises equipment in accordance with the present invention.

Referring to FIG. 2, a schematic block diagram that illustrates receive circuitry 60 and transmit circuitry 70 within a CPE in accordance with the present invention is shown. The receive path may include a low noise amplifier (LNA) 61 and conventional signal processing components 63 for filtering and mixing, etc. The transmit path may simultaneously include a frequency modulator 73 and a power amplifier 71. It should be further recognized that if the CPE is provided in close proximity to the hub, the LNA and power amplifier may not be required. If the CPE is placed at a great distance from the hub, then the LNA and power amplifier may have to be enhanced. It should also be recognized that analog to digital conversion and vice versa (65,75) may optionally be provided in the CPEs if the intended purpose of the CPE merits same. For example, in set top boxes for analog broadcast, A/D conversion may not be required.

Figure 3:
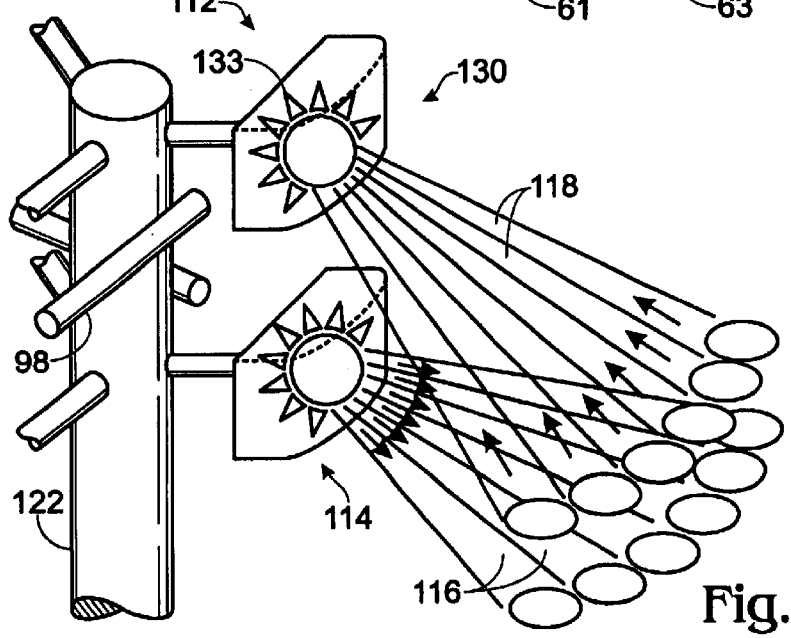
FIG. 3 is a diagram of an alternative hub arrangement for a WCS in accordance with the present invention.

Referring to FIG. 3, a diagram of an alternative hub arrangement for a WCS in accordance with the present invention is shown. The hub 112 of FIG. 3 is similar to that of FIG. 1, however, the transmit fan antenna is replaced with a shared aperture transmit antenna 114. This antenna may be a Luneberg lens or any other suitable shared aperture antenna device as discussed herein (and more particularly as discussed above for shared aperture mechanism 30). The receive antenna mechanism 130 is preferably the same as the receive antenna mechanism 30 of FIG. 1 or as otherwise discussed herein.

The use of hub-based shared aperture antenna devices 114,130 for both transmit and receive creates a highly energy efficient wireless communication system. The shared aperture devices generate or receive, respectively, pencil beam transmissions which have a higher link margin than conventional fan transmissions. Transmit pencil beams are designated with reference numeral 116, while receive pencil beams are designated with reference numeral 118. Shared aperture antenna devices further provide a compact and significantly higher density arrangement of antenna feeds (33,133) compared, for example, to individual pencil beam antennas or a pencil beam antenna array mounted to frame 122. The shared aperture devices also tend to be more energy efficient and provide component consolidation that permits an overall higher bandwidth of signal processing.

It should be recognized that the receive and transmit antennas of FIG. 3 could be provided in the same antenna, for example, the function of antenna mechanism 130 could be carried out by antenna mechanism 114 (or vice versa) and the additional structure of antenna mechanism 130 could be removed. In this case, shared aperture antenna mechanism 114/130 would be further shared between transmit and receive requiring appropriate time or frequency (or like) multiplexing of receive and transmit signals, and circuitry for processing and converging/splitting the two communication channels (RX,TX). Such circuitry would be apparent to one of ordinary skill in the art, given the teachings herein.

The arrangement of FIG. 3 also includes "outside cell" pencil beam antennas 98. Outside cell pencil beam antennas 98 can provide direct hub-to-hub, hub-to-satellite and/or hub-to-fiber optic access point wireless communication, etc. System level implementation of these antennas is discussed in more detail below with reference to FIG. 7.

Figure 4:
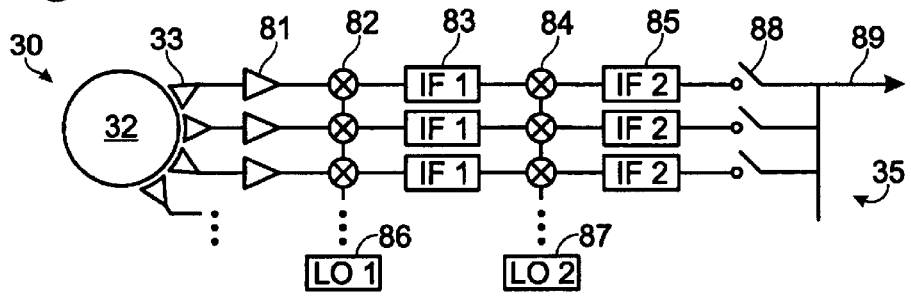
FIGS. 4–6 are schematic block diagrams of embodiments of processing circuitry for a shared aperture receive antenna mechanism in accordance with the present invention.

Referring to FIG. 4, a schematic diagram of circuitry 35 for processing signals received at a hub from the various CPEs in accordance with the present invention is shown. FIG. 4 illustrates a Luneberg lens or other shared aperture device 32 and a plurality of feeds 33. Each of the feeds is coupled to a processing path that includes a low noise amplifier 81, a first LO mixer 82, a first IF filter and amplifier 83, a second LO mixer 84 and a second IF filter and amplifier 85. An LO generator 86,87 is coupled to each of the mixers (note that only one is shown per column to avoid crowding in the drawing). A combining switch 88 (e.g., a time multiplexed switch) is provided downstream of the second IF amplifier of each path. Switch 88 couples second IF signals into a common output path 91.

Figure 5:
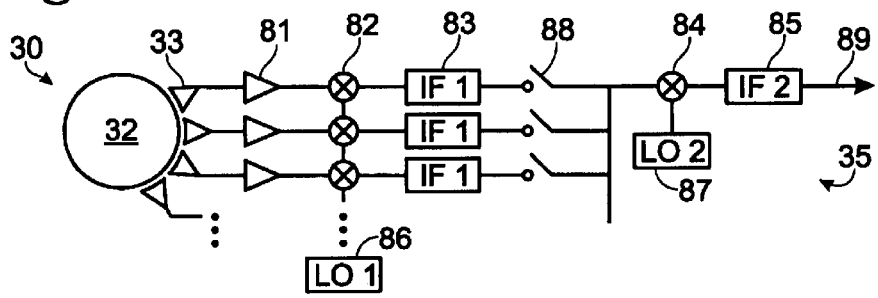
Figure 6:
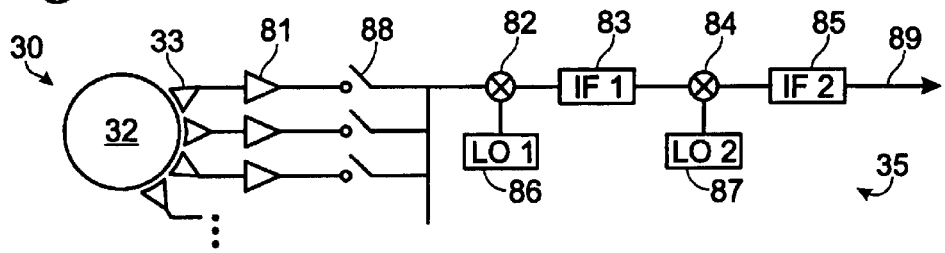

Referring to FIGS. 5–6, schematic diagrams of alternative embodiments of circuitry 35 for processing signals received at a hub from the CPEs in accordance with the present invention are shown. In FIG. 5, the combining switch 88 is provided downstream of the first IF filter and amplifier 83. In FIG. 6, the combining switch 88 is provided downstream of the input low noise amplifier 81. By providing the combining switch closer to the feeds, duplication of components is reduced. More specifically, common LO generators may be provided for a plurality of input feed signal processing paths, resulting in a system implementation cost reduction.

Figure 7:
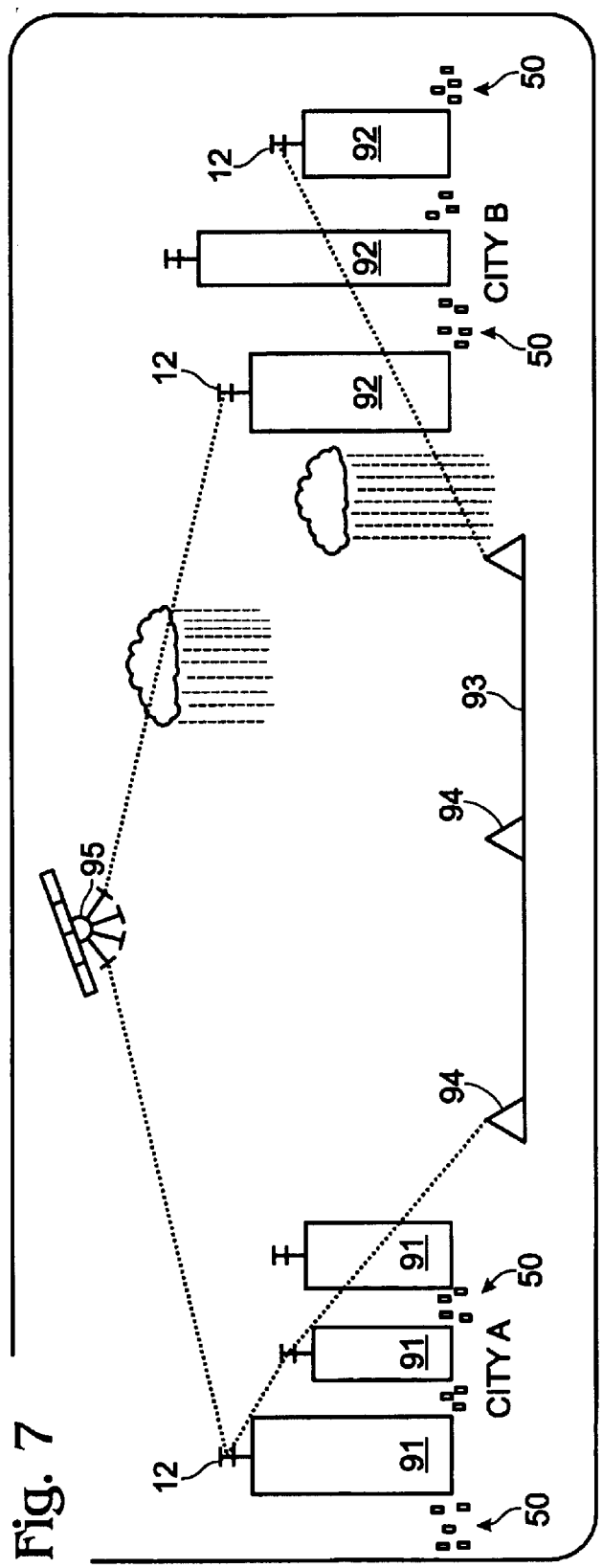
FIG. 7 is a diagram illustrating an implementation of a WCS in accordance with the present invention.

Referring to FIG. 7, a diagram further illustrating use of the WCS of FIG. 1 (and FIG. 3) in accordance with the present invention is shown. The wireless communication system of the present invention is preferably used in a "fixed" location implementation, though it may be used in other implementations. Due to interference and attenuation concerns, hubs 12 and CPEs 50 are preferably provided in line-of-sight arrangements.

In the representative implementation of FIG. 7, buildings 91–92 each have a hub 12 mounted on their rooftop. Buildings 91 are in City A and buildings 92 are in City B. A fiber optic cable 93 is provided between the cities and a plurality of access points 94 are provided along cable 93. A satellite 95 also provides communication between cities A and B. Each hub 12 has a plurality of associated CPEs 50.

In addition to communication with associated CPEs (e.g., CPEs within an associated cell or sector), each hub 12 may be configured for communication with another hub, a satellite or a fiber optic access point, etc., for transmitting data between one of its associated CPEs and another CPE or another destination. To achieve hub to satellite communication, a dedicated pencil beam antenna 98 (shown in FIG. 3) may be utilized. To achieve hub to fiber optic cable communication, a dedicated pencil beam 98 directed towards access point 94 or a direct fiber optic connection may be utilized. To achieve hub-to-hub communication, a dedicated pencil beam may again be utilized. Amongst other considerations, hub to hub communication is advantageous when one hub is in line-of-sight with a fiber optic access point and a second hub, but the second hub is not in line-of-sight with or otherwise connected to the fiber optic medium. The second hub can communicate through a pencil beam (98) mediated relay on the first hub to gain access to the fiber optic cable. Notwithstanding the hub to non-CPE communication teaching discussed immediately above, the hub and CPEs are preferably arranged in plurality of sectors within a hub-based cell and a plurality of hub-based cells within a system. Smaller sector size, e.g., a few degrees, results in narrower beams and more energy efficient signal transmission. The hubs may be connected to hardwired communication infrastructure.

Figure 8:
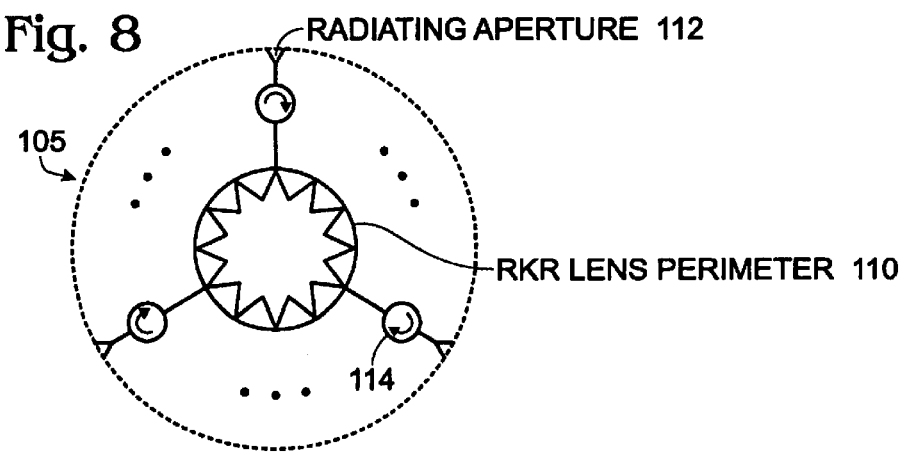
FIGS. 8–9 are diagrams of alternative antenna arrangements in accordance with the present invention.
Figure 9:
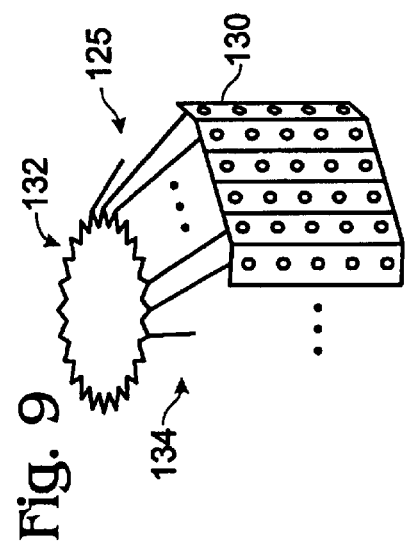

Referring to FIGS. 8–9, alternative antenna arrangements in accordance with the present invention are shown. The embodiments of FIGS. 8–9 are intended to illustrate that inventive aspects of the present invention may be carried out with a range of antenna arrangements (only two of which are shown in FIGS. 8–9), and that the present invention is not limited to the antenna arrangements illustrated in the drawings herewith.

FIG. 8 is a lens schematic for an RKR multi-beam antenna which may have a circular, cylindrical and/or stacked arrangement. A stacked arrangement may reduce elevation beamwidth. The antenna arrangement 105 of FIG. 8 includes an RKR lens 110, a plurality of antenna elements 112 that may be used for transmit and/or receive and circulators 114 that provide power in (RX) or power out (TX) as appropriate. Arrangement 105 could be used as the transmit and/or receive antenna mechanism 14,30.

FIG. 9 illustrates an exemplary phased array antenna arrangement 125 that includes an antenna element array 130 fed via a Rotman-Turner lens or a Blass/Butler matrix 132 in accordance with the present invention. The feed network 134 for the array is preferably aligned in columns. The antenna array may be configured in a planar or cylindrical manner, and/or may be further configured to facilitate a desired transmit or receive radiation pattern (e.g., curved to increase/decrease elevation, etc.). The arrangement of FIG. 9 could be used for antenna mechanisms 14 and/or 30.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A hub apparatus for a millimeter wave wireless communication system, comprising:
   a support member;
   a fan beam antenna coupled to said support member that propagates electromagnetic energy in a fan pattern;
   a receive antenna mechanism coupled to said support member that receives a plurality of pencil beam transmissions from different customer premises equipment (CPEs). located in different physical locations within the range of the radiation pattern of said fan antenna; and
   a supplemental pencil beam antenna coupled to said support member and separate from said receive antenna mechanism that is capable of transmitting electromagnetic energy beyond the range of said fan antenna, such that at a given distance from said hub, the signal propagated from said supplemental pencil beam antenna has a greater signal strength than a signal propagated from said fan antenna.

2. The apparatus of claim 1, wherein said fan beam antenna mechanism propagates an electro-magnetic radiation pattern that has an azimuth component that is greater than its elevation component.

3. The apparatus of claim 1, wherein said fan antenna propagates millimeter wave electro-magnetic energy.

4. The apparatus of claim 1, wherein said receive antenna mechanism includes a shared aperture antenna device.

5. The apparatus of claim 4, wherein said shared aperture antenna device is a phased array antenna device.

6. The apparatus of claim 4, wherein said shared aperture antenna device is a multi-beam antenna device and has a plurality of individual feeds provided therewith, each feed propagating a pencil beam transmission from a different physical location.

7. The apparatus of claim 4, wherein said shared aperture antenna device includes a Luneberg lens.

8. The apparatus of claim 1, wherein said receive antenna mechanism is an array of pencil beam receive antennas.

9. The apparatus of claim 1, wherein at least one of said fan beam antenna and said receive antenna mechanism is configured to function in 360 degrees in azimuth.

10. A hub apparatus for a millimeter wave wireless communication system, comprising:
    a support member;
    a transmission antenna coupled to said support member that propagates electromagnetic energy in a pattern that has an azimuth component that is larger than the elevation component;
    a receive antenna mechanism coupled to said support member that receives a plurality of pencil beam transmissions from different customer premises equipment (CPEs) located in different physical locations within the range of the radiation pattern of said transmission antenna; and
    a supplemental pencil beam antenna coupled to said support member and separate from said receive antenna mechanism that is capable of transmitting electromagnetic energy beyond the range of said fan antenna, such that at a given distance from said hub, the signal propagated from said supplemental pencil beam antenna has a greater signal strength than a signal propagated from said fan antenna.

11. A hub apparatus for a millimeter wave wireless communication system, comprising:
    a support member;
    a hub-based transmit antenna coupled to said support member that propagates electromagnetic energy to a plurality of customer premises equipment (CPEs) within the range illuminated by said transmit antenna; and
    a hub-based receive antenna mechanism coupled to said support member that receives a plurality of pencil beam transmissions from different CPEs located in different physical locations within the range of the transmit antenna, said receive antenna mechanism including a shared aperture antenna device;
    wherein said receive antenna mechanism includes a plurality of receive signal processing channels that each have a first mixer for separation of a first set of IF signals, and wherein each of said mixers is coupled to a common LO signal generator.

12. The apparatus of claim 11, wherein said transmit antenna includes a shared aperture antenna device.

13. The apparatus of claim 12, wherein the shared aperture transmit antenna device and the shared aperture receive antenna device utilize at least in part a common shared aperture device; and
    said hub apparatus further includes circuitry for processing separate receive and transmit signals from and to, respectively, that common shared aperture device.

14. The apparatus of claim 12, wherein said shared aperture transmit antenna device includes a phased array antenna device.

15. The apparatus of claim 12, wherein said shared aperture transmit antenna device includes a multi-beam antenna device.

16. The apparatus of claim 11, wherein said transmit antenna includes a fan antenna device.

17. A millimeter wave wireless communication system, comprising:
- a hub support structure;
- a hub-based transmit antenna coupled to said support structure for transmitting electro-magnetic energy;
- a plurality of customer premises equipment (CPEs) capable of receiving electro-magnetic radiation from said hub-based antenna, and each CPE including a pencil beam antenna for transmitting electro-magnetic energy towards said hub support structure; and
- a receive antenna mechanism coupled to said hub support structure that receives pencil beam electro-magnetic energy from each of said plurality of CPEs;
- wherein said receive antenna mechanism includes a plurality of receive signal processing channels that each have a first mixer for separation of a first set of IF signals, and wherein each of said mixers is coupled to a common LO signal generator.

18. The system of claim 17, wherein the pencil beam antenna of each CPE is used for transmit and receive.

19. The system of claim 18, wherein said transmit antenna and said receive antenna mechanism are configured to propagate millimeter wave electro-magnetic energy.

20. The system of claim 17, wherein said hub-based receive antenna mechanism includes a shared aperture antenna device.

21. The system of claim 17, wherein said hub-based transmit antenna includes a shared aperture antenna device.

22. The system of claim 17, wherein said hub-based receive antenna mechanism includes an array of pencil beam receive antennas.

* * * * *